March 10, 1936. R. J. NOBLE 2,033,586
GATE OPERATING DEVICE FOR AUTOMATIC WEIGHING MACHINES
Filed Sept. 12, 1933 2 Sheets-Sheet 1

Inventor
Robert J. Noble
By Lyon & Lyon
Attorney

March 10, 1936.   R. J. NOBLE   2,033,586
GATE OPERATING DEVICE FOR AUTOMATIC WEIGHING MACHINES
Filed Sept. 12, 1933   2 Sheets-Sheet 2
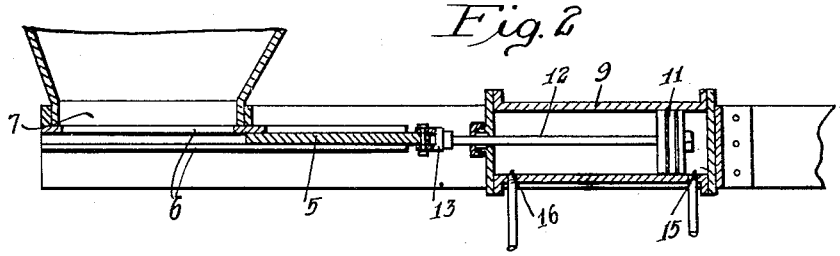
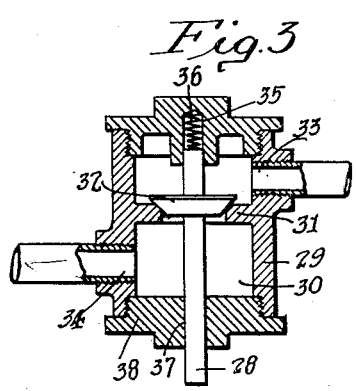
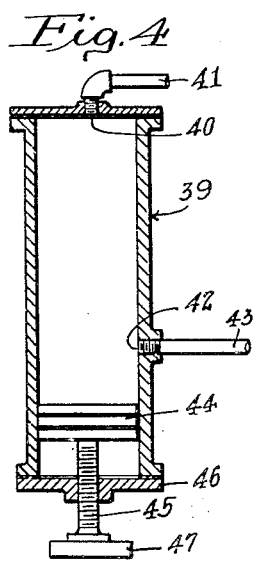
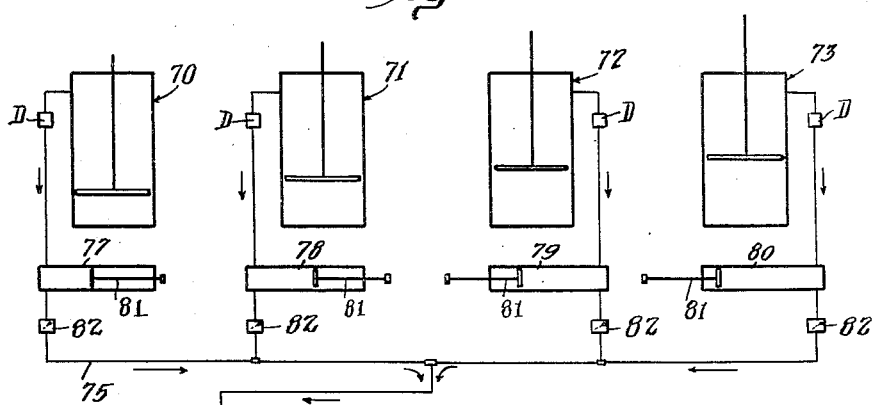
Inventor
Robert J. Noble
By Lyon & Lyon
Attorney

UNITED STATES PATENT OFFICE 2,033,586

GATE OPERATING DEVICE FOR AUTOMATIC WEIGHING MACHINES

Robert J. Noble, Glendale, Calif., assignor to Roads Construction Company, Ltd., Glendale, Calif., a corporation of California Application September 12, 1933, Serial No. 689,061

4 Claims. (Cl. 249—45)

This invention relates to gate operating devices, and has particular reference to apparatus for controlling the operation of gates for machines designed to automatically weigh predetermined quantities of materials discharged from suitable storage bins.

In automatic weighing machines for controlling the discharge of dry ingredients from storage bins considerable difficulty is encountered in compensating for the amount of material in suspension between the outlet of the bin and the hopper or other receptacle into which the material is discharged, so that while various devices have been designed for the purpose of automatically closing gates or other closures for the discharge ends of the bins when a predetermined weight of material has been deposited in the hopper, such devices are not and can not be made accurate, since when a predetermined weight of material rests on the hopper effective to operate the weighing device a considerable quantity of as yet unweighed material is descending from the bin to the hopper, and the weight of such suspended material varies so greatly that it is impossible to more than estimate the same.

One remedy for this defect is to make the discharge opening so small that the amount of suspended material is substantially negligible, but when such method is employed for weighing considerable quantities of the material it slows up the discharge of material and renders the weighing apparatus extremely inefficient.

It is, therefore, an object of this invention to provide automatic weighing machines of the character set forth with a closure for the bins, which may provide a relatively large discharge opening for the material until the major portion of the desired weight of material has been discharged, and then to provide a reduced opening through which the remainder of the desired weight of material is discharged, keeping the amount of material in suspension during the last part of the weighing operation to an amount which is substantially negligible, or which is so small that it may be readily and accurately estimated.

Another object of the invention is to provide a single gate or closure, which may be opened to present a relatively large discharge opening during a portion of the weighing operation and then be partially closed to present a small opening for the last portion of the weighing operation.

Another object of the invention is to provide a gate of the character set forth in the preceding paragraph, in which the gate is automatically controlled in its closing operations to partially close when a predetermined portion of the desired weight has been discharged, and then completely closed when the total desired weight has been discharged.

Another object of the invention is to provide a gate of the character set forth with power-operating means, and to provide an electrical control for the power means which is automatically controlled by the balance or weighing of the discharged material.

Other objects of the invention will be apparent from a study of the following specification read in connection with the accompanying drawings, wherein—

Figure 2 is a detail sectional view through the gate and its operating cylinder;

Figure 3 is a sectional view through one of the valves employed to control the gate operation;

Figure 4 is a sectional view of an exhaust cylinder or tank employed to control the partial closing movement of the gate; and Figure 5 is a diagrammatic view illustrating a further embodiment of my invention adapted to be employed with a plurality of gates.

Figure 1:
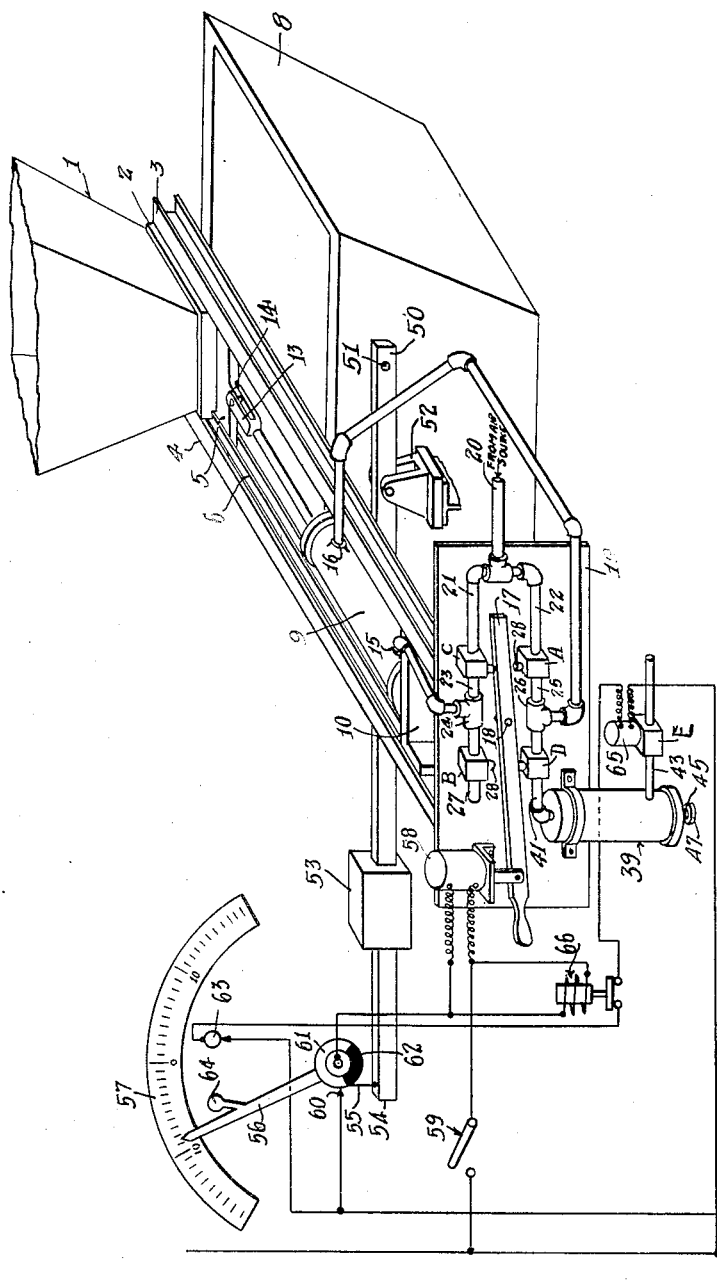
Figure 1 is a diagrammatic view, partially in perspective, illustrating a gate and its control constructed in accordance with the invention.

Referring to the drawings, there is illustrated one end of a discharge spout 1 extending from a suitable bin, not shown, in which the material to be weighed may be stored. The lower end of the spout 1 is illustrated as being provided with a suitable frame 2 constituting the discharge end of the spout. Secured to the frame 2 are a pair of horizontal beams 3 and 4, which constitute a supporting device for a gate 5 and its operating mechanism. The gate 5 is illustrated as being formed as a flat plate arranged to reciprocate horizontally along suitable guide rails 6 formed upon the inner surfaces of the beams 3 and 4, the gate in its forward position closing the lower end 7 of the spout 1, while in its rearward position, as illustrated in Figure 2, the gate is withdrawn from the opening 7 allowing material to pass through the opening 7 into a suitable receiving bucket or hopper 8.

The gate 5 is arranged to be moved from its forward or closed position to its rearward or open position and back to its closed position by means of fluid pressure power means, including a cylinder 9, suitably supported upon brackets 10 mounted on the beams 3 and 4, and having a piston 11 reciprocating therein and connected through a suitable piston rod 12 to a clevis 13, which is, in turn, secured to a lug 14 extending from one end of the gate 5.

By referring particularly to Figure 2, it will be observed that the cylinder 9 is provided with a pair of ports 15 and 16, one on each side of the piston 11, so that by admitting fluid, such as air, under pressure through the port 15 the piston will be moved to close the gate 5, while air admitted through the port 16 will retract the gate to its open position.

The opening and closing operations of the gate 5 may be suitably controlled by means of a control bar 17 pivotally mounted, as indicated at 18, to a supporting plate 19. The bar 17 is illustrated as being mounted for movement in a vertical plane, in which a plurality of controlled valves A, B, C and D are mounted, the pivot point 18 of the bar 17 being such that upward movement of the left hand end of the bar will cause the valves A and B to open, while downward movement of the left-hand end of the bar 17 will cause the valves A and B to close and the valves C and D to open.

Fluid pressure from any suitable source may be supplied to the valves A and C in any suitable manner, as by a pipe 20, bearing the legend "From air source", one branch 21 of the pipe extending to the valve C and the other branch 22 extending to the valve A. The valve C is illustrated as being connected through a short length of pipe or tubing 23 to the valve B, a T-joint 24 connecting the pipe 23 with the closing port 15 of the cylinder 9. Similarly, a pipe 25 connects the valve A with the valve D, a T-joint 26 and suitable piping being employed to connect the pipe 25 with the gate opening port 16.

Thus, upward movement of the left-hand end of the bar 17 will cause the valve A to open, allowing the fluid pressure to pass to the T-joint 26 and thence to the gate opening port 16, while at the same time the valve B is opened to connect the closing port 15 to an exhaust pipe 27, allowing any air accumulated on the rear side of the piston 11 to be exhausted to the atmosphere. Thus, air admitted through the port 16 will retract the piston 11 and move the gate 5 to its open position.

When a predetermined quantity of the material has been deposited from the chute 1 in the bucket or hopper 8, the left-hand end of the bar 17 may be lowered, which will cause the bar to move out of contact with the valve rod 28 of the valve A, and also move out of contact with the operating rod 28 of the valve B, allowing these valves to be closed.

By referring particularly to Figure 3, it will be observed that each of the valves A, B, C and D may be ordinary poppet valves of well-known construction, in which a body 29 forms a chamber 30 divided by a partition or valve seat 31, on which a poppet valve 32 may rest. The valve body 29 is provided with an inlet opening 33 on one side of the valve seat 31 and an outlet opening 34 on the opposite side of the seat 31. The valve 32 is preferably rigidly mounted upon the valve stem or rod 28, one end of which operates in a guide socket 35, in which a suitable spring 36 may be housed normally urging the valve 32 to closed position upon its seat 31. The opposite end of the rod 28 extends through a guide opening 37 in the base 38 of the valve body so that the outer end of the rod 28 is exposed for contact by the bar 17. It will be noted that as soon as the bar 17 is moved out of contact with the rod 28, the spring 36 will urge the valve to closed position and thereafter any air pressure entering through the inlet opening 33 will tend to keep the valve 32 closed upon its seat. By employing four valves, as illustrated in Figure 3, any one of these valves may be readily replaced without requiring the replacement of any of the other valves, and each of the valves may be so arranged in the system that the fluid pressure in the system will maintain the valves closed, except when positively opened by the bar 17.

Further downward movement to the left-hand end of the bar 17 will engage the operating rods of the valves C and D, opening these valves. The opening of valve C will supply air from the source to the port 15 of the cylinder 9, urging the piston to its outward or gate closing position, while the opening of valve D will connect the port 16 with an auxiliary cylinder 39, allowing air on the forward side of the piston 11 to exhaust not to the atmosphere but into the auxiliary cylinder 39. Thus, the air which was previously on the forward side of the piston 11 will enter the auxiliary cylinder 39 until the pressure in the cylinder 39 has been built up to equal the pressure of the air from the source entering the cylinder 9 through the port 15. In this manner, the gate will be moved to a partially closed position, the extent of movement thereof depending upon the effective volume of the auxiliary cylinder 39. The amount of such partial closing movement may be readily adjusted by changing the effective volume of the cylinder 39.

By referring particularly to Figure 4, it will be noted that the cylinder 39 is provided with an inlet port 40 connected through a suitable pipe 41 to the outlet opening of the valve D, and is also provided with an outlet port 42 extending to an auxiliary valve E, which when opened allows air in the cylinder 39 to exhaust to the atmosphere through a suitable exhaust pipe 43. The cylinder 39 is provided with a piston 44, which may be mounted within the cylinder in any suitable manner, so that the piston may be adjusted along the length of the cylinder 39, as by means of a screw 45 extending through the bottom plate 46 of the cylinder 39 and provided with a suitable operating handle 47. Thus, by moving the piston 44 within the cylinder 39, the effective volume of the cylinder between the inlet opening 40 and the piston 44 may be varied at will.

Thus, by passing the exhaust air from the cylinder 9 to the auxiliary cylinder 39, the gate 5 may be held in its partially closed position until the auxiliary valve E is opened to allow the air in cylinder 39 to exhaust to the atmosphere. When the valve is opened the pressure of air from the source moves the piston 11 to its extreme position, completely closing the gate 5.

It will thus be observed that by arranging the bar 17 to be controlled automatically when the bucket or hopper has received the major portion of the desired weight of material, the effective opening of the chute 1 through its material discharge may be reduced for the final quantities of material necessary to bring the discharged material up to the desired weight, and then the valve E may be opened to complete the closing of the gate when the desired amount of material has been discharged into the hopper.

The automatic control of the bar 17 and the valve E may be arranged in any suitable manner responsive to the accumulation of weight in the hopper or bucket 8, one form of such control being illustrated herein adapting the gate operating mechanism for use with an automatic weighing system, such as shown and described in the copending application of Robert J. Noble, Serial No. 681,106, filed July 19, 1933, on "Recording method and apparatus". Such control is diagrammatically illustrated herein as including a square beam 50, to one end of which is secured the bucket or hopper 8, as indicated at 51. The beam 50 is fulcrumed upon a suitable support, diagrammatically illustrated at 52, while the opposite end of the beam 50 is provided with a suitable counterweight 53, which may be adjusted to any desired position to predetermine the quantity of material which must be discharged in the hopper to balance the beam 50. The outer end 54 of the beam 50 is illustrated as being connected, as indicated at 55, to a rotatable pointer 56, arranged to operate over a suitable dial 57 to indicate the balanced condition of the beam; that is, when the beam is balanced, the pointer 56 will register with the zero calibration on the dial 57, while when the hopper is empty or has not the full weight of material therein the pointer will be to the left of the zero calibration. The operation of the bar 17 may be readily achieved by means of a suitable magnet or solenoid 58 arranged to lift the left-hand end of the bar when the coil of the solenoid is energized. The circuit for the solenoid may be arranged to include a switch 59, which may be manually closed to start the opening of the gate or may be controlled automatically, as indicated in the Robert J. Noble application herein referred to.

The rotatable pointer 56 is preferably provided with a suitable switch which will be closed until the pointer has moved to within a predetermined distance of the zero calibration and then opened, such switch being diagrammatically illustrated as a contact piece 60 arranged to engage a contact segment 61 fixed to the pointer 56 and having an insulating segment 62 formed therewith, so that when the pointer 56 is at any position within a predetermined number of calibrations of the zero calibration an electrical circuit may be completed through the contact piece 60 and the segment 61, while when the pointer 56 is closer to the zero calibration such circuit would be broken. For example, the segment 61 may be so arranged that when the hopper 8 has received material up to ten pounds less than the desired amount, the circuit through the contacts 60, 61 will be closed, while as soon as the pointer indicates within ten pounds of the desired amount the circuit will be opened. Thus, the solenoid 58 will be deenergized during the discharge of the last ten pounds of material.

At this time the valves C and E will be opened to admit air from the source to the port 15 to start the closing movement of the gate but at the same time permitting the exhaust air from the forward side of the piston to pass through the port 16 and into the auxiliary cylinder 39.

For purposes of safety, it is desirable that the valve E should be of the normal open type to be closed whenever its controlling magnet 65 is energized so that in the event of failure of the electric supply this valve will be open to permit complete closing of the gate and thus prevent wasting of material. Hence at the time the solenoid 58 is being energized the magnet 65, controlling the valve E, should be energized and for this purpose I have illustrated the electric circuit supplying current to the valve magnet 65 as extending through normally closed contacts of a relay 66 which relay is connected in parallel relation to the magnet 58 and thus will be energized during the entire time the magnet 58 is energized. Thus when the magnet 58 is de-energized by the deposit of material within ten (10) pounds of the desired amount, the relay controlling the valve E will also be de-energized and will close its contacts, thus establishing a circuit which will close the valve E.

The final closing of the gate should occur when actual balance of the hopper with the desired amount of material therein has been attained, and I prefer to employ a device which is actuated by balancing of the hopper to break the circuit to the valve magnet 65.

As is disclosed in the copending application of Robert J. Noble, hereinbefore referred to, the weighing apparatus may be provided with a suitable switching mechanism operated when the material in the hopper balances the scale beam with the counterweight 53 set at the desired point. Such switch may comprise a photoelectric cell, illustrated herein at 63, arranged to be obscured by a mask 64 carried by the pointer 56, the relative arrangement of the mask 64 and the photoelectric cell 63 being such that the mask will obscure the cell at the instant the pointer arrives at the zero calibration when the hopper balances the counterweight. This balancing of the counterweight by the material in the hopper should be employed for automatically closing the gate through which the material is passed, and to accomplish this result the valve E controlling the exhaust from the auxiliary cylinder 39 may be provided with an electromagnetic operating means 65 connected in a suitable circuit controlled by a relay 66. Thus, at the instant the pointer 56 indicates the balanced condition of the hopper, the photo cell will be obscured by the mask and the relay 66 will be de-energized to close its contacts and thereby open the valve E. Up to this time, the air exhausted from the cylinder 9 was held accumulated in the auxiliary cylinder 39, holding the gate partially opened, but as soon as the valve E is operated, allowing the accumulated air in cylinder 39 to exhaust the air from the source which has been exerting pressure on the rear face of the piston 11, it will completely close the gate 5.

It will, therefore, be observed that the gate 5, provided with the operating means disclosed herein, can be controlled to open at will and will remain open until balance of the hopper is substantially achieved, but immediately prior to balancing will cause the gate to partially close. Thus, during the ingress of the last few pounds of material into the hopper the stream of material will be so small that the amount thereof in suspension between the end of the spout and the position of rest in the hopper will be substantially negligible. Hence, when the balancing of the hopper automatically results in the complete closing of the gate, only the exact desired amount of material will be in the hopper.

By referring particularly to Figure 5, it will be observed that a plurality of gate operating cylinders 70, 71, 72 and 73 may be controlled by a single auxiliary cylinder 74 by connecting the valves D for each of these cylinders to a common pipe 75 communicating with the auxiliary cylinder 74 so that independent of which of the gate operating cylinders is under control at any given time, the exhaust from the forward side of the piston for any of these cylinders may be passed to the auxiliary cylinder and thus controlled by the operation of the valve E in the same manner as was described with reference to Figure 1.

With the arrangement shown in Figure 5, it will be possible to compensate for the sizes of the particles of material which are to be controlled by each of the several gates by permitting each of these gates to move to a different partially closed position depending upon the graining of the material controlled by the individual gate. For example, if the gate controlled by the cylinder 70 is used for the passage of large rock, the gate, upon partial closure, should not limit the opening as much as the gate 73 which may be employed for the discharge of the finely ground cement, while, similarly, the gate controlled by the cylinders 71 and 72 should be moved to a partially closed position greater or lesser than that of the gates controlled by the cylinders 70 and 73, depending upon the size of the particles of material which pass through such gates. This may be readily accomplished even though the auxiliary cylinder 74 is employed by regulating the piston 76 of the auxiliary cylinder for the great volume required, namely, the volume required to permit the gate 73 to move to its most nearly closed position.

Each gate, however, may be individually controlled to stop the partial closing movement at any desired point by providing an expansion cylinder for each of the gate cylinders 70, 71, 72 and 73, such expansion cylinders being indicated by the reference characters 77, 78, 79 and 80, respectively.

Each of the expansion cylinders, like the cylinder 74, may be provided with an adjustable piston 81 so that the effective volume of the expansion cylinder 77 may be suitably adjusted so that the combined effective volume of the expansion cylinder 77 and the auxiliary cylinder 74 will permit the gate controlled by the gate cylinder 70 to move to its particular position. Likewise the remaining expansion cylinders may be provided with pistons 81 adjustable to the desired positions to stop the closing movement of these gates at any selected position.

In order to prevent the exhaust air from any one of the gate cylinders from affecting the other gate cylinders, I prefer to provide a check valve 82 in each of the individual pipes leading to the common pipe 75 so that while air may pass from any one of these pipes into the common pipe 75, air will not be permitted to pass from the common pipe into the individual pipes.

It will be understood by those skilled in the art that the individual control of the various valves D with each of the gate cylinders by interposing suitable relays between the balance indicators 56 and 57 and the individual magnets 58 employed for controlling the valves D, such individual control being illustrated and described in detail in the copending application of Robert J. Noble hereinbefore referred to, while the connection of the magnet employed for the operation of the valve E may be identical with that shown in Figure 1 so that it will operate upon each actuation of the photo cell 63 independent of which gate is in operation.

It will be understood by those skilled in the art that the hopper 8 will be employed to receive material successively from a number of different bins each of which is controlled by its individual gate and the beam and counterbalance mechanism may be arranged as described in the copending application hereinbefore referred to to permit the accumulated weight of the various materials to be measured and balanced to cause operation of the dial and pointer mechanism 56 and 57, and it is not believed necessary to repeat such description in detail herein.

While the preferred embodiment of the invention is disclosed herein, it is not desired to limit the invention to the details shown or described herein, except as defined in the appended claims.

I claim:

1. In a device for weighing material from storage apparatus, a receptacle for receiving material, a gate for said storage apparatus through which material may pass to said receptacle, a main cylinder and piston operably connected to said gate to actuate the same, a pair of ports in said cylinder one near each end thereof, means for selectively applying fluid pressure to either of said ports, an auxiliary cylinder of less volume than said main cylinder connected to receive the exhaust fluid from one of said ports whereby application of fluid pressure to the other of said ports will store the exhaust fluid in said auxiliary cylinder to permit only a partial movement of said gate, and means for controlling the exhaust from said auxiliary cylinder to permit said gate to complete its movement.

2. In a device for weighing material from storage apparatus, a receptacle for receiving material, a gate for said storage apparatus through which material may pass to said receptacle, a main cylinder, a piston therein connected to said gate, a gate opening port communicating with said cylinder on one side of said piston, a gate closing port communicating with said cylinder on the opposite side of said piston, a source of air pressure, means connecting said source to each of said ports, valve means for controlling the admission of air from said source to each of said ports, an auxiliary cylinder connected to said gate opening port having a volume less than the volume of said main cylinder to receive exhaust air from said port to stop said gate when partially closed, and means controlling the exhaust of said auxiliary cylinder for finally closing said gate.

3. In a device for weighing material from storage apparatus, a receptacle for receiving material, a gate for said storage apparatus through which material may pass to said receptacle, a main cylinder, a piston therein connected to said gate, a gate opening port communicating with said cylinder on one side of said piston, a gate closing port communicating with said cylinder on the opposite side of said piston, a source of air pressure, means connecting said source to each of said ports, valve means for controlling the admission of air from said source to each of said ports, an auxiliary cylinder connected to said gate opening port having a volume less than the volume of said main cylinder to receive exhaust air from said port to stop said gate when partially closed, means controlling the exhaust of said auxiliary cylinder for finally closing said gate, and means in said auxiliary cylinder for varying the volume thereof.

4. In a device for weighing material from storage apparatus, a receptacle for receiving material, a gate for said storage apparatus through which material may pass to said receptacle, a main cylinder and piston operably connected to said gate to actuate the same, a source of fluid power for supplying power to said piston and cylinder, means for admitting said fluid power to said cylinder to open said gate, means for admitting said fluid power to said cylinder to close said gate, an auxiliary cylinder connected to said main cylinder to receive said gate-opening fluid and having a volume less than the volume of said main cylinder whereby discharge of said gate-opening fluid into said auxiliary cylinder will cause said gate to stop when partially closed, an exit for said auxiliary cylinder, and means for selectively opening said exit to cause said gate to move to a completely closed position.

ROBERT J. NOBLE.